United States Patent Office 2,757,214
Patented July 31, 1956

2,757,214

NEW PROCESS FOR PREPARING CHLOROFLUORO METHANES FROM PHOSGENE AND A METAL FLUORIDE

Earl L. Muetterties, Hockessin, Del., assignor to E. I. du Pont de Nemours and Company, Wilmington, Del., a corporation of Delaware No Drawing. Application February 18, 1955,
Serial No. 489,295

7 Claims. (Cl. 260—653)

This invention relates to a new process of preparing fluorine-containing organic compounds. More particularly, it relates to a process of preparing completely halogenated methanes in which at least one of the halogen atoms is fluorine, any other halogen being chlorine. These compounds will be referred to hereinafter as fluorine-containing perhalomethanes.

The fluorine-containing perhalomethanes, i. e., carbon tetrafluoride and the chlorofluoromethanes, and especially dichlorodifluoromethane, are extremely valuable compounds. They find extensive use as refrigerant liquids as dielectric fluids and as ingredients of insecticidal compositions, e. g., as propellants in aerosols.

This invention has as an object a new process for preparing fluorine-containing perhalomethanes. Other objects will appear hereinafter.

These objects are accomplished by the present invention of the process which comprises reacting phosgene at a temperature of at least 400° C. with a binary inorganic fluoride of an element having an atomic number from 11 to 83, inclusive, and isolating the fluorine-containing perhalomethanes formed.

The phosgene can be used preformed or it can be formed in situ from carbon monoxide and chlorine which, as is well known, combine readily at elevated temperature to give phosgene. When this is done, the two phosgene-forming components, i. e., carbon monoxide and chlorine, can be used in equimolar quantities, or one or the other can be used in excess.

The inorganic binary fluoride which serves as the source of fluorine can be the fluoride of any of those elements in groups I to VIII, inclusive, of the periodic table, which have atomic numbers from 11 to 83, inclusive. Reference to any accepted periodic table, e. g., that given on page 27 of F. Ephraim's "Inorganic Chemistry," fifth English edition (1949), will show what these elements are.

The respective proportions of phosgene (or its components) and inorganic fluoride are not critical. However, it is desirable to use the two reactants in such ratio that there is present in the reaction mixture at least one-fourth, preferably at least one-half, gram atom of fluorine per gram atom of chlorine. Normally, the reactants are used in approximately the ratio of one atom of fluorine per atom of chlorine.

The reaction produces a mixture of products. The three possible chlorofluoromethanes are formed, principally chlorotrifluoromethane and dichlorofluoromethane, which may be formed according to the following equation, using calcium fluoride as the illustrative reactant:

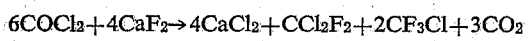

Carbon dioxide is always found in the reaction products. Carbon tetrafluoride is normally formed in small amounts, and traces of carbon tetrachloride are sometimes present. Two other products, carbonyl fluoride and carbonyl chlorofluoride are also formed. These may be formed according to the following equation, again using calcium fluoride:

It is also possible that part or all of the carbonyl fluoride results from the carbonyl chlorofluoride initially formed since it has been found experimentally that carbonyl chlorofluoride disproportionates at elevated temperature to give carbonyl fluoride and other products. For example, when carbonyl chlorofluoride is heated at 500° C. for one hour under autogenous pressure in a corrosion-resistant bomb, the resulting gaseous product is found by infrared analysis to contain carbonyl fluoride, carbonyl chlorofluoride, phosgene, carbon dioxide. A similar disproportionation of carbonyl chlorofluoride (0.34 mole) takes place in the presence of finely divided calcium fluoride (0.68 mole) at 500° C. for one hour under autogenous pressure, and in this case the product contains 20% carbonyl fluoride, 35% carbonyl chlorofluoride, 10% phosgene, 15% carbon dioxide, 5% chlorotrifluoromethane and 2% dichlorofluoromethane.

The reaction between phosgene and the inorganic binary fluoride to give fluorine-containing perhalomethanes should be carried out at a temperature of at least 400° C. and preferably at least 450° C. At lower temperatures the reaction, if it proceeds at all, does not produce perhalomethanes but solely carbonyl chlorofluoride and/or carbonyl fluoride. The reaction temperature can be much higher, e. g., up to 1000° C., but there is normally no advantage in using temperatures above about 700° C. The preferred temperature range is from about 500 to about 600° C.

The conversions to perhalomethanes are improved, especially in the lower temperature range (400–500° C.) by the presence of a small amount of a halide (particularly fluoride or chloride) of a metal in a valence state of 3 to 5. Examples of such promoters are aluminum trifluoride, tin tetrachloride, ferric fluoride and antimony pentachloride. These materials are used in molar amounts between 1 and 5%, based on the binary fluoride employed.

The reaction can be carried out at atmospheric pressure, for example by passing phosgene through a hot tube containing the inorganic fluoride and recycling the effluent gas, with or without separation of the reaction products. This procedure is operable but it entails practical difficulties in that, when the inorganic fluoride is solid at the reaction temperature, intimate contact between it and the gaseous reactant is difficult to achieve. If it is liquid and/or volatile, it is at least partly entrained by the gas stream and must be recovered and recycled. Thus, conversions are low when operating at atmospheric pressure. It is therefore preferred to carry out the reaction in a pressure vessel. Also, the use of pressure favors the presence of phosgene in the equilibrium reaction between it and its components, carbon monoxide and chlorine. The reaction is normally conducted under the autogenous pressure developed by the reactants and reaction products at the operating temperature but if desired additional pressure furnished by a non-interfering gas, such as carbon monoxide or nitrogen, can be applied, e. g., an additional pressure of 100–1000 atmospheres or even higher.

When operating under pressure, appreciable conversions are obtained at reaction times as low as thirty minutes at the reaction temperature. Normally, the reaction is allowed to proceed for at least one hour, and preferably for three to eight hours. Longer reaction times can be used, e. g., up to twelve hours, but they offer no special advantages since the conversions are not materially increased. It has been found that the catalysts or promoters already mentioned improve the conversions obtainable in short reaction times.

A convenient procedure for working up the crude reaction product consists in transferring the gaseous reaction mixture to an evacuated cylinder, leaving in the reaction vessel the non-volatile materials (unreacted inorganic fluoride and inorganic chlorides). The cylinder is then externally cooled to a low temperature, for example by means of liquid nitrogen, and pumped off to a low pressure, e. g., 0.1–1 mm. of mercury. This removes from the reaction mixture any air present in it, and it also removes the residual carbon monoxide, whose presence results either from its addition as a reactant or additional pressure gas or from its formation by partial dissociation of the phosgene used. After removal of the carbon monoxide, the cylinder is closed and allowed to warm to room temperature or to a temperature sufficient to permit vaporization of the volatile mixture, which is then fractionated in a suitable low temperature still to separate the various constituents. If the perhalomethanes are the only components it is desired to isolate, it is convenient to remove all the acidic gases (carbon dioxide, chlorine, unchanged phosgene, carbonyl chlorofluoride and carbonyl fluoride) prior to fractional distillation. This can be done by bringing the crude gaseous reaction product in contact with an aqueous alkaline solution, e. g., aqueous potassium or sodium hydroxide, used in sufficient amount to absorb all the products reactive therewith. Absorption of the acidic gases can be carried out in the cylinder used to receive the crude gaseous reaction product, or the latter can be passed directly through an absorbing apparatus containing the alkaline solution and the effluent gas can be fractionated with or without prior removal of the carbon monoxide.

The following examples in which parts are by weight unless otherwise specified are illustrative of the invention.

*Example I*

A mixture of 39 g. (0.5 mole) of commercial calcium fluoride and 49.5 g. (0.5 mole) of phosgene was heated in a steel bomb lined with a corrosion-resistant nickel-iron-molybdenum alloy for 6 hours at 500° C. under the autogenous pressure developed by the reactants and reaction products. The gaseous reaction product, which weighed 30.3 g. after removal of the carbon monoxide, was scrubbed with aqueous potassium hydroxide to remove the acidic or hydrolyzable bases. The remaining alkali-insoluble gas weighed 10.9 g. Infrared analysis showed that it contained, on a molar basis, 1% carbon tetrafluoride, 65% chlorotrifluoromethane, 30% dichlorodifluoromethane, about 5% trichlorofluoromethane, and a trace of carbon tetrachloride. The principal components of this mixture are separated by fractional distillation. However, the mixture is of itself useful as an aerosol propellant. The conversion, calculated on the basis of chlorotrifluoromethane as the sole product and using the equation

$$4COCl_2 + 3CaF_2 \rightarrow 3CaCl_2 + 2CF_3Cl + 2CO_2$$

was 42%.

A repetition of this example, except that the reaction time was 12 hours, gave about the same conversion to a product having substantially the same composition. When the reaction time was only 3 hours, other conditions being the same, there was obtained a 21% conversion to alkali-insoluble gas, containing on a molar basis 45% each of chlorotrifluoromethane and traces of carbon tetrafluoride and carbon tetrachloride.

*Example II*

The process of this example is similar to that of Example I except that an excess of chlorine was used.

A mixture of 39 g. (0.5 mole) of commercial calcium fluoride, 49.5 g. (0.5 mole) of phosgene and 18 g. (0.25 mole) of chlorine was heated at 500° C. for 6 hours in a corrosion-resistant bomb. The gaseous reaction product, which weighed 53.3 g. after removal of any carbon monoxide present, was scrubbed with aqueous 40% potassium hydroxide. The residual gas weighed 12.2 g. (47% conversion based on the phosgene, with chlorotrifluoromethane considered to be the entire product) and had the following composition in moles percent: carbon tetrafluoride, 1%; chlorotrifluoromethane, 60%; dichlorodifluoromethane, 35%; trichlorofluoromethane, 10%.

Iodometric titration of the scrubbing solution showed that 76% of the initial amount of chlorine had been recovered unchanged.

*Example III*

The process of this example is similar to that of Example I except that an excess of calcium fluoride was used.

A mixture of 78.0 g. (1.0 mole) of commercial calcium fluoride and 49.5 g. (0.5 mole) of phosgene was heated at 500 C. under autogenous pressure for 6 hours. The gaseous product, after removal of any carbon monoxide present and scrubbing with aqueous 40% potassium hydroxide, weighed 10.6 g. (41% conversion based on phosgene with chlorotrifluoromethane considered to be the only product). This gas contained, on a molar basis, 1–2% carbon tetrafluoride, 65% chlorotrifluoromethane, 30% dichlorodifluoromethane, and 5–10% trichlorofluoromethane.

It is possible to increase the relative proportion of dichlorodifluoromethane in the reaction product by incorporating in the reaction mixture a small amount, e. g., 5–20 moles percent based on the inorganic fluoride, of an alkali or alkaline earth metal carbonate. However, the total conversions to perhalomethanes appear to be lower when this is done. Example IV, below, which is otherwise comparable to Example I, illustrates this variation.

*Example IV*

A mixture of 39.0 g. (0.5 mole) of commercial calcium fluoride, 6.9 g. (0.05 mole) of anhydrous potassium carbonate and 49.5 g. (0.5 mole) of phosgene was heated at 500° C. for 6 hours under autogenous pressure. After scrubbing the gaseous reaction product with 40% aqueous potassium hydroxide, there was left 2.3 g. of a product having the following molar composition: carbon tetrafluoride, 1%; chlorotrifluoromethane, 15%; dichlorodifluoromethane, 65%; trichlorofluoromethane, 15–20%; carbon tetrachloride, trace. The conversion was 8%, based on dichlorodifluoromethane as the sole product.

Commercial calcium fluoride contains, as shown by emission spectroscopy, from 0.05 to 0.5% of aluminum. This impurity can be removed, for example by heating the calcium fluoride with potassium carbonate or by fusing it with calcium chloride, and extracting the mass with distilled water until it is free from carbonate or chloride ions. The resulting calcium fluoride contains then only traces of aluminum and other elements such as silicon and iron. It is then found to be less reactive with phosgene than the non-purified material. For example, repeating Example I with a sample of calcium fluoride purified by fusion with calcium chloride and extraction with water gave a 10% conversion to chlorofluoromethanes. However, addition of a polyvalent (at least trivalent) metal halide as a promoter markedly increases the conversion, as shown in Example V, below.

*Example V*

The calcium fluoride used in this example was first heated at 500° C. for one-half hour with anhydrous potassium carbonate, extracted with distilled water until free of carbonate, and dried at 400° C. A mixture of 39.0 g. (0.5 mole) of this calcium fluoride, 49.5 g. (0.5 mole) of phosgene and 1.13 g. (0.01 mole) of ferric fluoride was heated at 500° C. for 3 hours. After scrubbing the gaseous reaction product with aqueous alkali there was left 9.9 g. of inert gas having the following molar composition: carbon tetrafluoride, less than 5%; chlorotrifluoromethane, 70%; dichlorodifluoromethane, 25%; trichlorofluoromethane, 5%. The conversion was 38% based on trifluorochloromethane as the sole product.

*Example VI*

A mixture of 39.0 g. (0.5 mole) of commercial calcium fluoride, 49.5 g. (0.5 mole) of phosgene and 0.84 g. (0.01 mole) of aluminum fluoride was heated at 400° C. for 6 hours under autogenous pressure. The gaseous product, which weighed 35.0 g., was scrubbed with 40% aqueous potassium hydroxide. There was obtained 1.8 g. of inert gas containing on a molar basis, less than 1% carbon tetrafluoride, 25% chlorotrifluoromethane, 60% dichlorodifluoromethane and 15% trichlorofluoromethane. The conversion was 6%, based on dichlorodifluoromethane as the sole product.

*Example VII*

The procedure of Example VI was repeated, except that the reaction mixture was heated at 500° C. for one hour. The alkali-insoluble gas (3.8 g.) contained, on a molar basis, less than 1% carbon tetrafluoride, 35% chlorotrifluoromethane, 55% dichlorodifluoromethane and 10% trichlorofluoromethane. The conversion was 13% based on dichlorodifluoromethane as the sole product.

*Example VIII*

A mixture of 39.0 g. (0.5 mole) of commercial calcium fluoride, 35.5 g. (0.5 mole) of chlorine and 14 g. (0.5 mole) of carbon monoxide was treated as in Example I and the crude gaseous reaction product (25.8 g. after removal of any remaining carbon monoxide by pumping off at liquid nitrogen temperature) was scrubbed with aqueous potassium hydroxide. The remaining gas (8.5 g.) was shown by infrared analysis to contain, on a molar basis, 1% carbon tetrafluoride, 55% chlorotrifluoromethane, 40% dichlorodifluoromethane, and 5–10% trichlorofluoromethane. The conversion was 33% based on chlorotrifluoromethane as the sole product.

In the two following examples the gaseous reaction product was analyzed without prior treatment with alkali in order to determine the nature of the alkali-reactive components.

*Example IX*

A mixture of 49.5 g. (0.5 mole) of phosgene, 45 g. (0.58 mole) of calcium fluoride, and 5 g. of antimony pentachloride, used as reaction catalyst, was heated in a steel bomb at 500° C. for 3 hours under autogenous pressure. The gaseous reaction product (38 g. total weight) was found by infrared analysis to contain, on a molar basis, 3% carbonyl fluoride, a small amount of carbonyl chlorofluoride, 10% phosgene, 10% carbon dioxide, 0.5% carbon tetrafluoride, 10% chlorotrifluoromethane, 3% dichlorodifluoromethane, and 3% hydrogen chloride. The remainder was probably in part chlorine (which has no infrared absorption band) and in part adventitious air in the infrared cell. The various components are separated by fractional distillation, with the exception of carbonyl fluoride and hydrogen chloride which have practically the same boiling points. These may be separated by bringing the mixture thereof in contact with at least two moles of sodium fluoride, per mole of hydrogen chloride in the mixture, and maintaining the mixture in contact with the sodium fluoride, preferably at room temperature, until the hydrogen chloride has been absorbed from the mixture. This separation of carbonyl fluoride from hydrogen chloride is the subject of application Serial No. 489,294 concurrently filed by Charles W. Tullock.

*Example X*

A mixture of 49.5 g. (0.5 mole) of calcium fluoride and 35.5 g. (0.5 mole) of chlorine was placed in a steel bomb which was heated to 450° C. and pressured with carbon monoxide to 800 atmospheres pressure. The bomb was maintained at 450° C. for 6 hours. After removing the excess carbon monoxide by evaporation at reduced pressure and liquid nitrogen temperature, the remaining gaseous reaction product (15.5 g.) was found by infrared analysis to contain, on a molar basis, 2% carbonyl fluoride, 13% carbonyl chlorofluoride, 40% phosgene, 20% carbon dioxide, 0.5% chlorotrifluoromethane, 0.5% dichlorodifluoromethane, 1% hydrogen chloride, and 5% silicon tetrafluoride. The last component is presumably formed through hydrolysis of the carbonyl fluorides by adventitious moisture and reaction of the resulting hydrogen fluoride with the glass of the analytical cell.

*Example XI*

A pressure vessel containing 21.0 g. (0.5 mole) of sodium fluoride and 49.5 g. (0.5 mole) of phosgene was heated at 500° C. for 6 hours. After removing any carbon monoxide present and scrubbing the crude gaseous reaction product (26.5 g.) with aqueous potassium hydroxide, the residual gas (8.1 g.) was found to contain, on a molar basis, 5% carbon tetrafluoride, 85% chlorotrifluoromethane, 5% dichlorodifluoromethane, and less than 1% trichlorofluoromethane. The conversion based on the sodium fluoride and with chlorotrifluoromethane as the sole product was 46.5%.

When the above experiment was repeated, except that 0.84 g. (0.01 mole) of aluminum fluoride was added to the reaction mixture, the conversion on the same basis was raised to 65.5%. The alkali-insoluble product (11.4 g.) contained, in moles percent, 5% carbon tetrafluoride, 90% chlorotrifluoromethane, 5% dichlorodifluoromethane, and less than 1% trichlorofluoromethane.

*Example XII*

A pressure vessel containing 44.0 g. (0.33 mole) of arsenic III fluoride and 49.5 g. (0.5 mole) of phosgene was heated at 500° C. for 6 hours. The gaseous reaction product, after removal of any carbon monoxide present and scrubbing with aqueous 40% potassium hydroxide, weighed 5.8 g. This represents a 22% conversion, with chlorotrifluoromethane considered to be the entire product, and on the basis of the equation

$$2COCl_2 + AsF_3 \rightarrow AsCl_3 + CO_2 + CF_3Cl$$

This produce contained, on a molar basis, 85% chlorotrifluoromethane, 10% dichlorodifluoromethane, and traces of carbon tetrafluoride and carbon tetrachloride.

*Example XIII*

A mixture of 38.6 g. (0.33 mole) of cobalt III fluoride and 49.5 g. (0.5 mole) of phosgene was heated at 500° C. for 6 hours under autogenous pressure. The crude gaseous product (45.0 g.) contained 3.8 g. of alkali-insoluble gas having the following molar compositions: carbon tetrafluoride, 10%; chlorotrifluoromethane, 75%; difluorodichloromethane, 15%; trichlorofluoromethane, trace. The conversion based on the phosgene and with chlorotrifluoromethane considered as the entire product was 15%.

The process of this invention is also applicable to the preparation of bromofluoromethanes by reaction of carbonyl bromide, or of carbon monoxide and bromine, with the binary inorganic fluorides defined above. In this case, however, the conversions are very poor with most inorganic fluorides, probably because carbonyl bromide is strongly dissociated at the operating temperautres. Acceptable conversions are, however, observed with the more reactive binary inorganic fluorides. Thus, when a mixture of mercury II fluoride (59.7 g., 0.25 mole), bromine (80 g., 0.5 mole), carbon monoxide (14 g., 0.5 mole) and aluminum fluoride (0.84 g., 0.01 mole) is heated at 500° C. for 3 hours under autogenous pressure, there is obtained 1.4 g. of alkali-insoluble gas having the following molar composition: carbon tetrafluoride, 55%; bromotrifluoromethane, 40%; octafluoropropane, less than 1%; hexafluoroethane, trace; trifluoromethane, 1%. The conversion was 8% based on the mercury II fluoride and assuming the product to be a 1:1 mixture of carbon tetrafluoride and bromotrifluoromethane.

While this invention has been illustrated through the use of certain specific inorganic fluorides, it comprises broadly the process of preparing fluorine-containing perhalomethanes by reacting phosgene, or its precursor components, i. e., carbon monoxide and chlorine, with a binary fluoride of an element of atomic number from 11 to 83, inclusive. The fluorides of these elements in any valence state can be used. Thus, in addition to the fluorides of the examples, there can be used potassium fluoride, copper II fluoride, magnesium fluoride, zinc II fluoride, barium fluoride, mercury II fluoride, aluminum III fluoride, titanium IV fluoride, tin II fluoride, lead II fluoride, phosphorus II fluoride, antimony III fluoride, antimony V fluoride, bismuth III fluoride, chromium III fluoride, tungsten VI fluoride, manganese III fluoride, chlorine III fluoride, iron II fluoride, iron III fluoride, cobalt II fluoride, nickel II fluoride, etc. Metal fluorides are in general more desirable. The preferred fluorides because they give the highest conversions to chlorofluoromethanes, are those of the elements in groups I and II of the periodic table, and particularly the binary fluorides of the alkali forming metals, i. e., the alkali metals and alkaline earth metals. The most useful fluorides are calcium fluoride and sodium fluoride.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. The process for preparing completely halogenated methanes in which at least one halogen atom is fluorine, any other halogen being chlorine, which comprises bringing phosgene in contact at a temperature of at least 400° C. with a binary inorganic fluoride of an element having an atomic number of 11 to 83, inclusive, and isolating the said halogenated methanes.

2. The process for preparing completely halogenated methanes in which at least one halogen atom is fluorine, any other halogen being chlorine, which comprises bringing phosgene in contact at a temperature of at least 400° C. with a binary metallic fluoride of a metal having an atomic number of 11 to 83, inclusive, and isolating the said halogenated methanes.

3. The process for preparing completely halogenated methanes in which at least one halogen atom is fluorine, any other halogen being chlorine, which comprises bringing phosgene in contact at a temperature of at least 400° C. with a binary fluoride of an alkali forming metal of atomic number of 11 to 83, inclusive, and isolating the said halogenated methanes.

4. The process for preparing completely halogenated methanes in which at least one halogen atom is fluorine, any other halogen being chlorine, which comprises bringing phosgene in contact at a temperature of at least 400° C. with calcium fluoride and isolating the said halogenated methanes.

5. The process of claims 1–3 wherein the binary fluoride has added thereto a small amount of a binary halide of a metal having, in the halide, a valence of 3 to 5.

6. The process for preparing completely halogenated methanes in which at least one halogen atom is fluorine, any other halogen being chlorine, which comprises bringing phosgene in contact at a temperature of at least 400° C. with calcium fluoride containing a small amount of a binary halide of a metal having, in the halide, a valence of 3 to 5 and isolating the said halogenated methanes.

7. The process for preparing completely halogenated methanes in which at least one halogen atom is fluorine, any other halogen being chlorine, which comprises bringing phosgene in contact at a temperature of at least 400° C. with sodium fluoride and isolating the said halogenated methanes.

No references cited.